Oct. 31, 1961    A. I. APPLETON ET AL    3,006,664
SELF-SEALING FITTING FOR FLEXIBLE CONDUIT
Filed Jan. 6, 1958
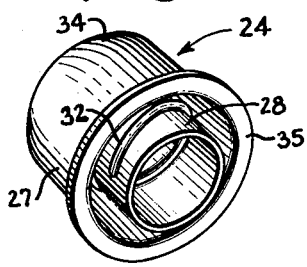
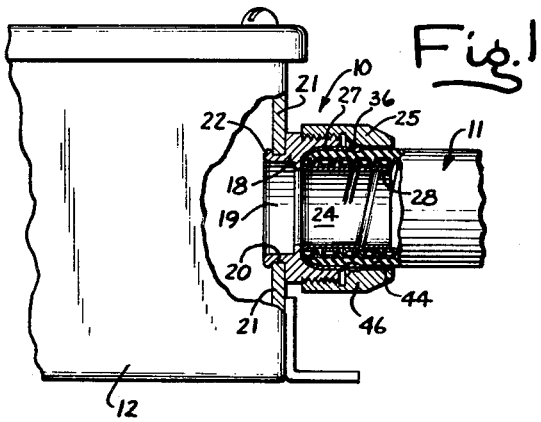
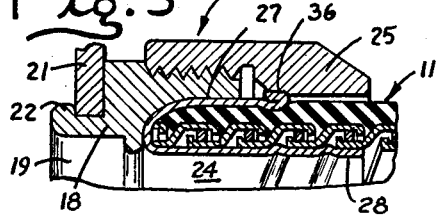
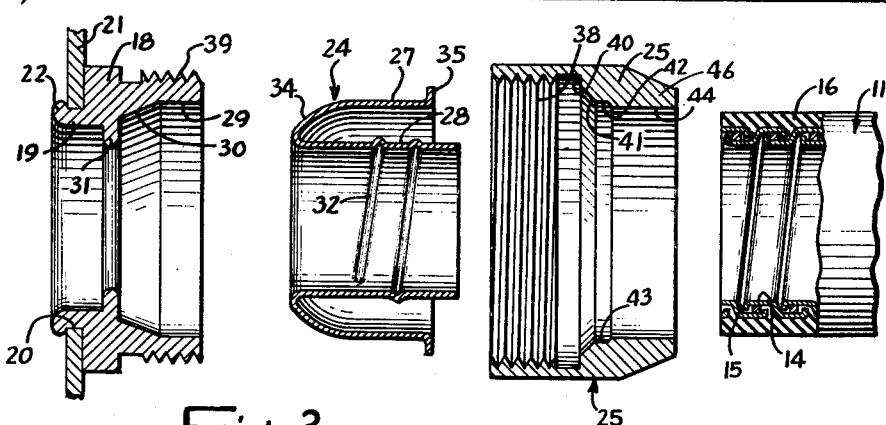
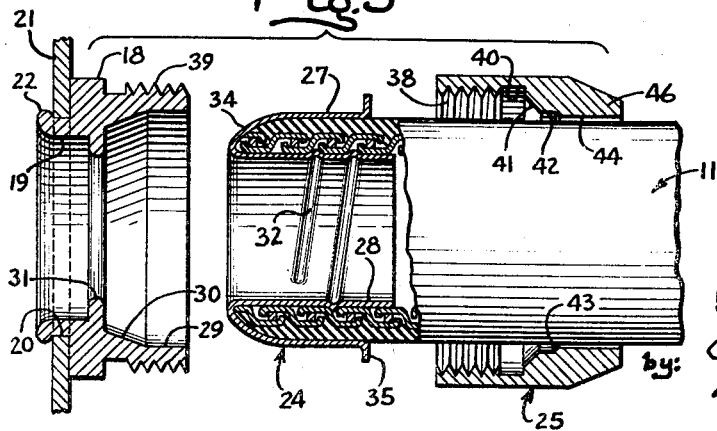
INVENTORS
ARTHUR I. APPLETON
NORTON A. APPLETON
by: Carlson, Pitzner,
Hubbard & Wolfe
ATTYS

United States Patent Office 3,006,664
Patented Oct. 31, 1961

3,006,664
SELF-SEALING FITTING FOR FLEXIBLE CONDUIT
Arthur I. Appleton, Northbrook, and Norton A. Appleton, Northfield, Ill., assignors to Appleton Electric Company, Chicago, Ill., a corporation of Illinois
Filed Jan. 6, 1958, Ser. No. 707,227
1 Claim. (Cl. 285—248)

The present invention relates to conduit fittings for attaching a flexible conduit, having an external protective sheath of resilient or yieldable material surrounding an inner spirally wound flexible metallic core, to a stationary fixture or other fitting. More particularly, the present invention is concerned with separable conduit fittings including essentially a body attachable to the fixture, a thimble for receiving an inserted end of the conduit and for anchoring the conduit securely within the body, and a sealing nut for squeezing the thimble around the protective sheath and for sealing the thimble within the body. This invention is an improvement over the conduit fitting disclosed in U.S. Patent No. 2,782,060 issued February 19, 1957 to Arthur I. Appleton, one of the inventors of the present invention.

Fittings of the type to be described herein are most generally manufactured for standardized sizes of conduit. In the case of flexible conduit of the above type, however, it has been found that the outer dimensions of the resilient protective sheath may vary among different pieces of conduit although the conduit is of one nominal size.

It is the general object of the invention to provide a new and improved fitting of the above type in which a fluid-tight seal is obtained between a flexible conduit and the fitting even though the outer diameter of the protective sheath on the conduit may be slightly less than the nominal standard and for which the fitting is designed, and which does not require the use of resilient sealing members for effecting the seal.

Another object of the invention is to provide a new and improved fitting which supports the conduit against lateral deflection in the vicinity of the seal and thereby prevents cutting and tearing of the sheath by the fitting.

A further object of the invention is to provide a new and improved thimble which enables the nut to exert a tight squeeze on the conduit sheath and which affords an enhanced fluid-tight seal between the conduit and the fitting.

Still another object of the invention is to provide a fitting of the above character which is of simple and economical construction, which comprises parts readily manufactured on a mass production basis, and which is simply and easily installed in the factory or in the field.

Other objects and advantages of the invention will become apparent as the following description proceeds taken in connection with the accompanying drawings wherein:

FIGURE 1 is a side elevation view, partly in section of an illustrative fitting embodying the present invention, such fitting being installed between a flexible conduit and a box wall;

FIG. 2 is an enlarged exploded section view of the fitting of FIG. 1 and its associated conduit prior to installation of the fitting;

FIG. 3 is an enlarged section view illustrating an intermediate step in the installation of the fitting; and FIG. 4 is a perspective view showing an internal ferrule element of the fitting.

While the invention is susceptible of various modifications and alternative constructions, a certain preferred embodiment has been shown in the drawing and will be described below in considerable detail. It should be understood however, that there is no intention to limit the invention to the specific form disclosed. On the contrary, the intention is to cover all modifications, alternative constructions, equivalents, and uses falling within the spirit and scope of the invention as expressed in the appended claim.

Referring now to the drawings, an illustrative connector or fitting 10 embodying the present invention is there shown for use in sealing a flexible conduit 11 to an electrical box 12 so that a fluid-tight seal is provided between the conduit and the fitting. In another of its aspects the fitting adds support against lateral deflection of the conduit in the vicinity of the seal thereby preventing the conduit sheath from being cut or torn as the conduit is flexed.

The flexible conduit 11 is of the type having a hard core defined by a spirally wound metallic strip 14 having partially overlapping convolutions. The latter are arranged in such a manner that a spiral groove 15 is defined along the inner peripheral surface of the conduit. A protective sheath 16 of resilient or yieldable material, such as synthetic rubber or plastic encloses the spiral metallic core 14 which is thus adapted to house electric wiring or to conduct fluids.

The fitting 10 comprises a hollow body 18 of tubular or sleeve-like form, which in this case happens to be provided with a thin annular end portion 19 adapted to be inserted through a corresponding aperture 20 in a box wall 21 where it is peened or spun to form a bead 22 holding the body 18 securely to the box or stationary fixture.

Provision is made for receiving an unstripped end of the conduit within the body 18 and for anchoring the same therein tightly and securely so that it is capable of resisting great axial pull-out forces. To this end the fitting includes a ferrule or thimble which is adapted for positive attachment to the free end of the conduit and for subsequent insertion into the sleeve member 18 where it is held in place and sealed to the conduit by a sealing nut 25.

The thimble comprises a thin brass cap-like member which is generally annular in shape and includes an outer sleeve portion 27 for surrounding the flexible conduit sheath 16 and an inner sleeve portion 28 for insertion within the conduit in engagement with the flexible metallic core 14. Although a thimble formed of rolled brass has been found satisfactory, any suitable light gauge metal material may be used.

For receiving the thimble, the body 18 is formed with a counterbore 29 having an inwardly tapering seat 30 terminating in an abrupt radial shoulder 31. The counterbore 29 and tapering seat 30 communicate directly with the main bore of the body as defined by the annular portion 19 but are of substantially larger diameter than that bore.

The inner sleeve portion 28 of the ferrule is formed with spiral threads 32 rolled or otherwise formed therein so as to project above its outer peripheral surface. The threads have substantially the same pitch as the groove 15 between the spiral convolutions of the conduit core 14. Since the inner sleeve is of slightly smaller diameter than the inside diameter of the conduit, it will be appreciated that the sleeve can readily be threaded into the conduit end.

The outer sleeve portion 27 of the thimble is of substantially larger diameter than the inner sleeve portion 28 and is disposed in spaced relation with respect thereto by a web portion 34 integrally joining the inner and outer sleeves 27, 28. The web 34 is generally rounded and may be provided with an outwardly tapering portion overlying the inner sleeve.

The thimble is readily attached to the free end of a flexible sheathed conduit by simply inserting the inner sleeve into the end of the conduit and bringing the threads into engagement with the spiral groove between the core convolutions. Prior to this step the sealing nut 25 which attaches to the fitting body should first be slipped over the end of the conduit. No advance special preparation of the conduit end need be made, the thimble 24 being susceptible of readily engaging a roughly sawed end of the conduit. Attachment of the cap to the conduit may, of course, be facilitated by forming the outer sleeve portion 27 with a slight outward flare or skirt adjacent its free end.

In accordance with the present invention, the thimble affords an enhanced fluid-tight seal between the fitting and the conduit sheath when the sealing nut is tightened on the body regardless of variation in the outside diameter of the sheath.

To this end, the free end of the outer sleeve terminates in a bead-forming radial flange 35 adapted to be deformed and folded back against the outer surface of the sleeve 27 when the sealing nut 25 is tightened in place.

The bead 36 thus formed (see FIG. 1) being of greater thickness than the outer sleeve, tightly squeezes the flexible resilient sheath thereby providing a fluid-tight seal between the conduit and the thimble. While the bead may be formed directly on the thimble, an enhanced sealing action is obtained if the thimble is formed with a flange adapted to be deformed into a bead as the sealing nut is tightened onto the body and the outer sleeve is squeezed against the conduit.

Turning now to the sealing nut, the same is formed with internal threads 38 adapted for engagement with external threads 39 on the body surrounding the counterbore 29 and seat 30. The threads run axially of the nut to an intermediate point which may for example be a run-out groove 40 for the threading tool. Between the threads and the outer end of the nut, the nut is formed with a relatively heavy tapered internal shoulder 41 decreasing somewhat abruptly in diameter toward the outer end of the nut, in other words, the end of the nut remote from the body, and ending at a radial groove 42 which in turn ends abruptly in a shoulder 43 and a bore 44 making a comfortable sliding fit with the conduit sheath 16. The tapered nut shoulder 41 and the thimble flange 35 are so proportioned that the larger end of the shoulder will just fit over the flange 35 on the end of the skirt or outer sleeve 27, when these two members are brought together.

In order to attach the fitting to the free end of the conduit 11 the latter is sawed off to desired length, the nut 25 slipped over the end of the conduit, and the thimble 24 is threadably attached thereto until the web 34 abuts the end of the conduit as indicated in FIG. 3. The body 18 is attached to a stationary fixture 12 such as a box or other device. The end of the conduit with the thimble attached is then thrust into the body counterbore 29 and the nut 25 is brought into threaded engagement with the body 18.

As the nut 25 is tightened, the tapered shoulder 41 therein exerts a progressive radially inward and axial squeeze on the edge of the flange 35 and thus on the thimble sleeve 27. This squeezing action deforms the flange back and radially against sleeve 27 and deforms the sleeve radially against the conduit sheath 16 in a sort of spinning action to form the sealing bead 36. Because any radial deformation of the conduit core 14 will be negligible, it will be perceived that the deforming sleeve 27 and flange 35 will exert a corresponding annuar squeeze on the resilient conduit sheath material 16 so as to effect a highly satisfactory seal with but without destructively biting into the sheath.

When the flange 35 is folded back against the outer sleeve of the thimble to form a bead 36, this beaded end of the thimble is received within the groove 42 in the nut. Further tightening of the nut is then accompanied by a simultaneous thrusting action of the nut shoulder 43 on the ferrule bead 36 thereby wedging the tapered surface of the web 34 snugly against the tapered seat 30 in the body. In addition to the fluid-tight seal thus created, the rubbing metal-to-metal contact between the nut, the thimble, and the body on the one hand and between the thimble and the conduit on the other hand produces an exceptionally high degree of electrical ground continuity which is most valuable when the fitting is used in an electrical conduit system.

By forming the thimble with the radial flange on its free end and by deforming that flange to fold it against the outer sleeve portion of the thimble as a bead and then squeezing this bead of the thimbles against the conduit, it will be obvious to one skilled in the art that an exceptionally tight seal is provided between the conduit and the fitting regardless of variations in the diameter of the conduit sheath, the combined thickness of the thimble outer sleeve and the flange being sufficient to accommodate any such variations.

In accordance with another aspect of the present invention, provision is made for preventing the seal between the thimble and the conduit sheath from causing the flexible conduit sheath to tear in the event the conduit is severely flexed in the vicinity of the fitting. This is accomplished by means supporting the conduit against flexure in the immediate vicinity of the seal. As shown in the drawing, one such means comprises an axially extending sleeve portion 46 integral with the end of the nut 25 remote from the body. This sleeve portion 46 makes a comfortable but snug sliding fit with the outer surface of the conduit sheath and in so doing provides a support which effectively resists lateral deflection of the conduit in the vicinity of the seal which might otherwise cause the flexible sheath on the conduit to be cut or torn by the thimble.

We claim as our invention:

A fitting adapted for attachment to the free end of a conduit having a yieldable outer sheath thereon comprising, in combination, a sleeve-like body having a main bore and having a counterbore at one end thereof, a tapered seat in said body situated between the bore and the counterbore, said seat tapering inwardly from the counterbore toward the main bore, a transverse shoulder situated between said tapered seat and the main bore, external threads on said body disposed in surrounding relation with the counterbore and said inwardly tapered seat, an annular thimble adapted to fit over the free end of the conduit and having an inner sleeve portion adapted for insertion into the conduit along the inner peripheral wall theerof and having means for positively attaching said thimble to the conduit, said thimble further having an outer sleeve portion disposed in radially spaced surrounding relation with said inner sleeve, one end of said outer sleeve being fixed to said inner sleeve, the opposite end of said outer sleeve terminating in a substantially radially outwardly extending deformable sealing flange, said thimble being constructed and arranged for said one end to fit initially into said body with said outer sleeve extending through said counterbore into contact with said tapering seat and with said flanged opposite end being spaced outwardly of said counterbore, an annular sealing nut having threads engaging the said external threads on said body, said nut having a sleeve portion on the end thereof remote from said body defining a bore for receiving and supporting said conduit, and a tapered internal shoulder in said nut decreasing in diameter from the threaded end of said nut toward the sleeve end of said nut and terminating in a cylindrical portion of a diameter greater than that of said nut bore and said cylindrical portion terminating in an abrupt annular shoulder, said tapered internal shoulder being of sufficient diameter to engage said sealing flange and being of sufficient slope to bend said flange over said outer sleeve opposite end to form a sealing bead and urge said sealing bead radially inward against the conduit sheath as an incident to the tightening of said nut, said bead being received in said cylindrical portion and abutting said abrupt annular shoulder so that the tightening of said nut on said body will produce an increased axial thrust on said thimble forcing said thimble into sealed relation with said tapered seat and into abutting relation with said transverse shoulder.

References Cited in the file of this patent

UNITED STATES PATENTS

| | | |
|---|---|---|
| 2,321,260 | Stecher | June 8, 1943 |
| 2,405,822 | Franck | Aug. 13, 1946 |
| 2,417,536 | Wurzburger | Mar. 18, 1947 |
| 2,466,057 | Somma | Apr. 5, 1949 |
| 2,693,374 | Wurzburger | Nov. 2, 1954 |
| 2,761,704 | Crawford | Sept. 4, 1956 |
| 2,782,060 | Appleton | Feb. 19, 1957 |
| 2,798,744 | Budnick | July 9, 1957 |
| 2,934,362 | Franck | Apr. 26, 1960 |

FOREIGN PATENTS

| | | |
|---|---|---|
| 1,134,192 | France | Nov. 26, 1956 |